United States Patent [19]
Kikuchi

[11] Patent Number: 5,481,404
[45] Date of Patent: Jan. 2, 1996

[54] ZOOM LENS HAVING SUPER WIDE ANGLE

[75] Inventor: Shuichi Kikuchi, Yokohama, Japan

[73] Assignee: Ricoh Company, Ltd., Tokyo, Japan

[21] Appl. No.: 159,574

[22] Filed: Dec. 1, 1993

[30] Foreign Application Priority Data

Dec. 17, 1992 [JP] Japan ..................... 4-337561

[51] Int. Cl.⁶ .................................................. G02B 15/02
[52] U.S. Cl. .................................................... 359/674
[58] Field of Search ............................................. 359/674

[56] References Cited

U.S. PATENT DOCUMENTS

| | | | |
|---|---|---|---|
| 4,157,211 | 6/1979 | Tanaka et al. | 359/674 |
| 4,318,592 | 3/1982 | Tanaka et al. | 359/674 |
| 4,330,180 | 5/1982 | Tanaka et al. | 359/674 |
| 4,466,707 | 8/1984 | Ikemori et al. | 359/674 |
| 4,596,447 | 6/1986 | Yamada et al. | 359/674 |
| 4,708,442 | 11/1987 | Fujii et al. | 359/674 |
| 4,861,145 | 8/1989 | Kikuchi | 359/687 |
| 5,028,125 | 7/1991 | Kikuchi | 359/452 |
| 5,059,006 | 10/1991 | Kikuchi et al. | 359/680 |
| 5,097,360 | 3/1992 | Fukami et al. | 359/674 |
| 5,182,673 | 1/1993 | Kikuchi et al. | 359/691 |

FOREIGN PATENT DOCUMENTS

4033293A1 4/1991 Germany .
0011146 1/1974 Japan ......................... 359/674

Primary Examiner—Georgia Y. Epps
Assistant Examiner—Evelyn A. Lester
Attorney, Agent, or Firm—Oblon, Spivak, McClelland, Maier, & Neustadt

[57] ABSTRACT

A zoom lens having a super wide angle has a first lens group having positive refracting power and arranged on an object side of the zoom lens; a second lens group having negative refracting power and arranged on an image side of the zoom lens; and a converter lens having positive refracting power and detachably attached between the first and second lens groups. A focal length of the zoom lens is changed by changing a distance between the first and second lens groups. The distance between the first and second lens groups is set to be wide on a wide angle side in a zooming region and narrow on a telescopic side in the zooming region. The focal length of the zoom lens at the super wide angle is set to be shorter than that at a wide angle end in the zooming region by mounting the converter lens on the wide angle side. In accordance with this structure, the super wide angle at a focal length shorter than that at a normal wide angle can be realized by adding the converter lens to the zoom lens composed of the first positive lens group and the second negative lens group without substantially increasing an entire length of the zoom lens.

7 Claims, 8 Drawing Sheets

FILM FACE

Fig. 3b

FILM FACE

ZOOM LENS HAVING SUPER WIDE ANGLE

BACKGROUND OF THE INVENTION

1. Field of the Invention

The present invention relates to a zoom lens having a super wide angle at which a focal length of the zoom lens is shorter than that at a wide angle end in a zooming region. The zoom lens in the present invention can be utilized as a photographing lens in a lens shutter camera and a video camera.

2. Description of the Related Art

A super telescopic state is realized outside a zooming region peculiar to a zoom lens by adding a converter lens to the zoom lens. For example, such a structure is shown in Japanese Patent Application Laying Open (KOKAI) Nos. 2-219011 and 2-59709.

Recently, a panoramic photographing mode has been practically used. In this panoramic photographing mode, a photographing operation is performed by interrupting one portion of a film. To suitably cope with such a panoramic photographing mode, it is preferable to realize a super wide angle state of the zoom lens at a focal length shorter than that at a wide angle end in an original zooming region. There is no general known zoom lens which is composed of a first lens group having positive refracting power and a second lens group having negative refracting power and realizes a super wide angle by adding a converter lens to the zoom lens.

SUMMARY OF THE INVENTION

It is therefore an object of the present invention to provide a novel zoom lens which is composed of a first lens group having positive refracting power and a second lens group having negative refracting power and realizes a super wide angle at a focal length shorter than that at a normal wide angle by adding a converter lens to the zoom lens without substantially increasing an entire length of the zoom lens.

The above object of the present invention can be achieved by a zoom lens having a super wide angle comprising a first lens group having positive refracting power and arranged on an object side of the zoom lens; a second lens group having negative refracting power and arranged on an image side of the zoom lens; and a converter lens having positive refracting power and detachably attached between the first and second lens groups; a focal length of the zoom lens being changed by changing a distance between the first and second lens groups; the distance between the first and second lens groups being set to be wide on a wide angle side in a zooming region and narrow on a telescopic side in the zooming region; and the focal length of the zoom lens at the super wide angle being set to be shorter than that at a wide angle end in the zooming region by mounting the converter lens on the wide angle side.

In accordance with this structure, the super wide angle at a focal length shorter than that at a normal wide angle can be realized by adding the converter lens to the zoom lens composed of the first positive lens group and the second negative lens group without substantially increasing an entire length of the zoom lens.

Further objects and advantages of the present invention will be apparent from the following description of the preferred embodiments of the present invention as illustrated in the accompanying drawings.

BRIEF DESCRIPTION OF THE DRAWINGS

Each of FIGS. 3a and 3b is a view for explaining a modified example of the zoom lens having a super wide angle in which a sixth structure of the present invention is applied to the zoom lens in the embodiment shown in FIG. 1.

DESCRIPTION OF THE PREFERRED EMBODIMENTS

The preferred embodiments of a zoom lens having a super wide angle in the present invention will next be described in detail with reference to the accompanying drawings.

In the present invention, a zoom lens having a super wide angle has a first lens group, a second lens group and a converter lens.

The first lens group has positive refracting power and is arranged on an object side of the zoom lens.

The second lens group has negative refracting power and is arranged on an image side of the zoom lens.

The converter lens has positive refracting power and is detachably attached between the first and second lens groups.

A zooming region is set with respect to the first and second lens groups. A focal length of the zoom lens is changed in the zooming region by changing a distance between the first and second lens groups. This distance between the first and second lens groups is set to be wide on a wide angle side in the zooming region and is set to be narrow on a telescopic side in the zooming region. In accordance with a first structure of the present invention, the focal length of the zoom lens at the super wide angle is set to be shorter than that at a wide angle end in the zooming region by mounting the converter lens on the wide angle side.

In accordance with a second structure of the present invention, a diaphragm is arranged between the first and second lens groups in the above zoom lens. In this case, the converter lens is mounted between this diaphragm and the second lens group. A stopping-down amount of this diaphragm may be variable or fixed. When the stopping-down amount of the diaphragm is variable, the diaphragm is stopped down in association with the mounting of the converter lens in a super wide angle state in accordance with a third structure of the present invention. In contrast to this, when the diaphragm is not arranged or is set to a fixed diaphragm, the converter lens has a fixed diaphragm on an object side thereof in accordance with a fourth structure of the present invention.

In accordance with a fifth structure of the present invention, the distance between the first and second lens groups at a mounting time of the converter lens is equal to that at the wide angle end of the zoom lens. In accordance with a sixth structure of the present invention, when a panoramic photographing mode can be set, an aperture corresponding to a panoramic size is arranged just after a final lens face of the second lens group and is moved to a position just before an image face in association with the mounting of the converter lens.

In accordance with a seventh structure of the present invention, the converter lens is constructed by one negative lens and at least one positive lens. In this case, an average Abbe's number $v_P$ of the positive lens is set to be greater than an Abbe's number $v_N$ of the negative lens. In accordance with an eighth structure of the present invention, at least one lens face of the converter lens is constructed by an aspherical surface in the seventh structure.

The focal length of the zoom lens in the zooming region is changed by changing the distance between the first and second lens groups. This distance between the first and second lens groups is set to be long on the wide angle side and is set to be short on the telescopic side. Accordingly, when the super wide angle is realized, it is sufficient to mount the converter lens between the first and second lens groups spaced from each other at the long distance. In particular, in the fifth structure of the zoom lens, the converter lens can be mounted to the zoom lens while the distance between the first and second lens groups is held at the wide angle end of the zoom lens.

In each of the second to fourth structures of the present invention, the diaphragm is arranged between the first and second lens groups and the converter lens is mounted between the diaphragm and the second lens group. In this case, the distance between the diaphragm and the converter lens can be reduced so that a diameter of the converter lens can be reduced. In each of the third and fourth structures of the present invention, the diaphragm arranged in the zoom lens is stopped down in association with the mounting of the converter lens, or a fixed diaphragm is arranged on an object side of the converter lens. The diameter of the converter lens can be further reduced by reducing the diameter of a light beam focused and formed as an image at a mounting time of the converter lens so that it is possible to prevent a reduction in performance of the zoom lens caused by increasing a field angle.

In the sixth structure of the zoom lens, the aperture is arranged just after the final lens face of the second lens group. In this case, an opening width of the aperture according to a panoramic size is set to be greater than the width of a normal photographed image. When this aperture is moved to a position just before an image face in association with the mounting of the converter lens, a panoramic photograph can be taken at a super wide angle.

In accordance with the seventh structure of the present invention, the converter lens is constructed by one negative lens and at least one positive lens. Thus, it is possible to preferably correct aberrations caused by mounting the converter lens having positive refracting power as a whole. At this time, when an average Abbe's number $v_P$ of the positive lens is set to be greater than an Abbe's number $v_N$ of the negative lens, it is possible to preferably correct chromatic aberrations at the mounting time of the converter lens. Further, the aberrations can be more preferably corrected by constructing at least one lens face of the converter lens as an aspherical surface in accordance with the eighth structure of the present invention.

Figure 1A:
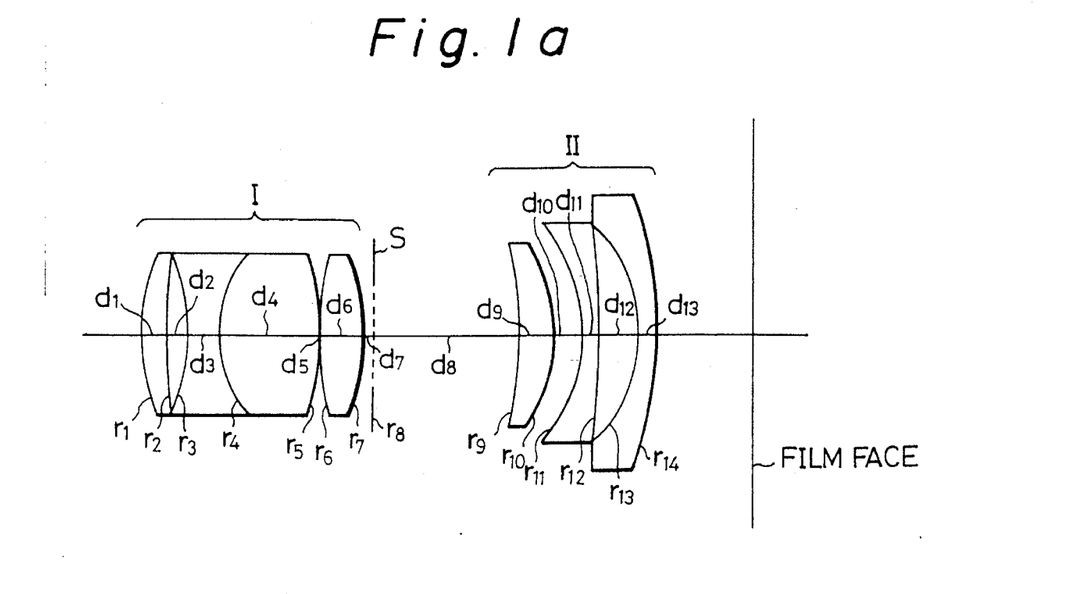
FIGS. 1a and 1b are views for explaining a zoom lens having a super wide angle in accordance with one embodiment of the present invention.
Figure 1B:
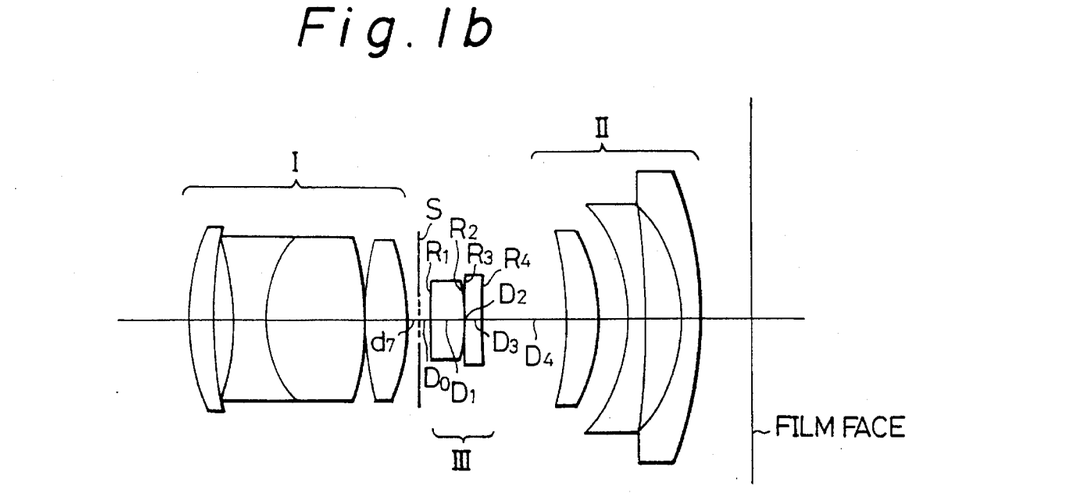

FIGS. 1a and 1b show embodiments of a zoom lens having a super wide angle and used as a photographing lens of a lens shutter camera in the present invention. In FIG. 1a, the zoom lens is composed of two lens groups constituting a lens structure for performing a zooming operation. Reference numeral I designates a first lens group on an object side of the zoom lens located on a left-hand side in FIG. 1a. Reference numeral II designates a second lens group arranged on an image side as a film face side. A diaphragm S is arranged just after the first lens group I. In FIG. 1a, the first and second lens groups are arranged at a wide angle end of the zoom lens in a zooming region.

In FIG. 1b, a converter lens III is mounted between the first lens group I and the second lens group II of the zoom lens shown in FIG. 1a. Concretely, the converter lens III is mounted between the diaphragm S and the second lens group II. FIG. 1b shows a state in which a super wide angle of the zoom lens is realized. A focal length of the zoom lens at the super wide angle is shorter than that at a wide angle of the zoom lens. Accordingly, an entire system of the zoom lens approaches a film face in comparison with a lens position at the wide angle end of the zoom lens. The diaphragm S is stopped down by mounting the converter lens III in comparison with a stopping-down slate of the diaphragm S at the wide angle end shown in FIG. 1a.

Figure 2:
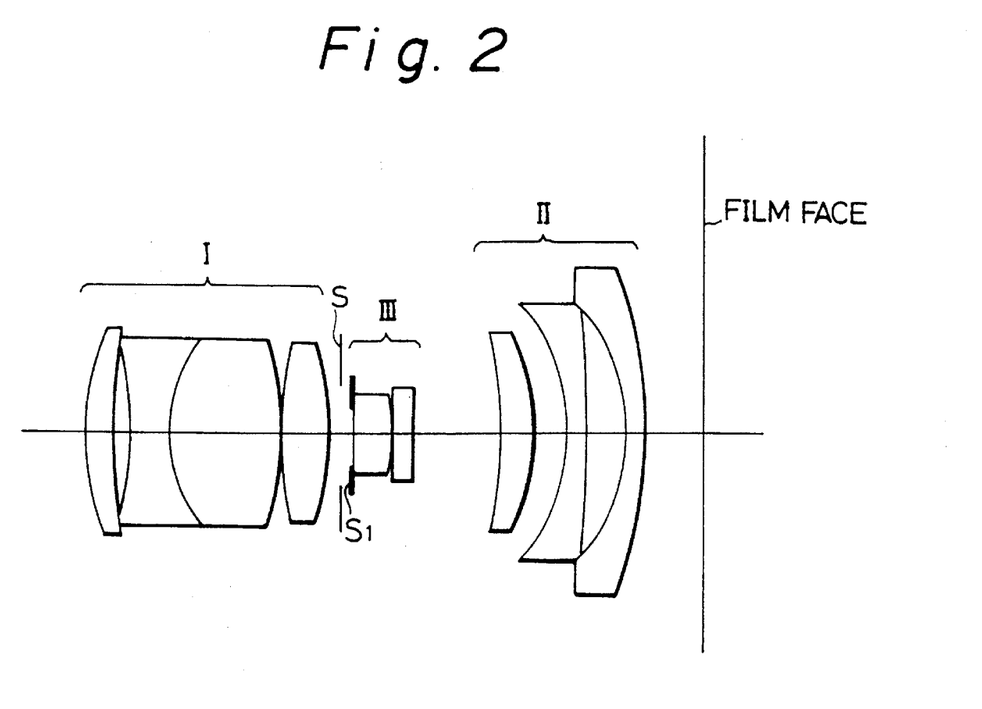
FIG. 2 is a view for explaining a modified example of the zoom lens having a super wide angle in which a fourth structure of the present invention is applied to the zoom lens in the embodiment shown in FIG. 1.

FIG. 2 shows a modified example of the zoom lens. In FIG. 2, no diaphragm S is stopped down, but effects similar to those in the stopping-down operation of the diaphragm S can be obtained by using a fixed diaphragm $S_1$ integrated with the converter lens III on the object side thereof. When the fixed diaphragm $S_1$ is integrated with the converter lens III on the object side thereof and is attached and detached from the zoom lens, it is not necessary to stop down the diaphragm S in association with mounting of the converter lens so that a lens mechanism is simplified in comparison with the zoom lens shown in each of FIGS. 1a and 1b.

Figure 3A:
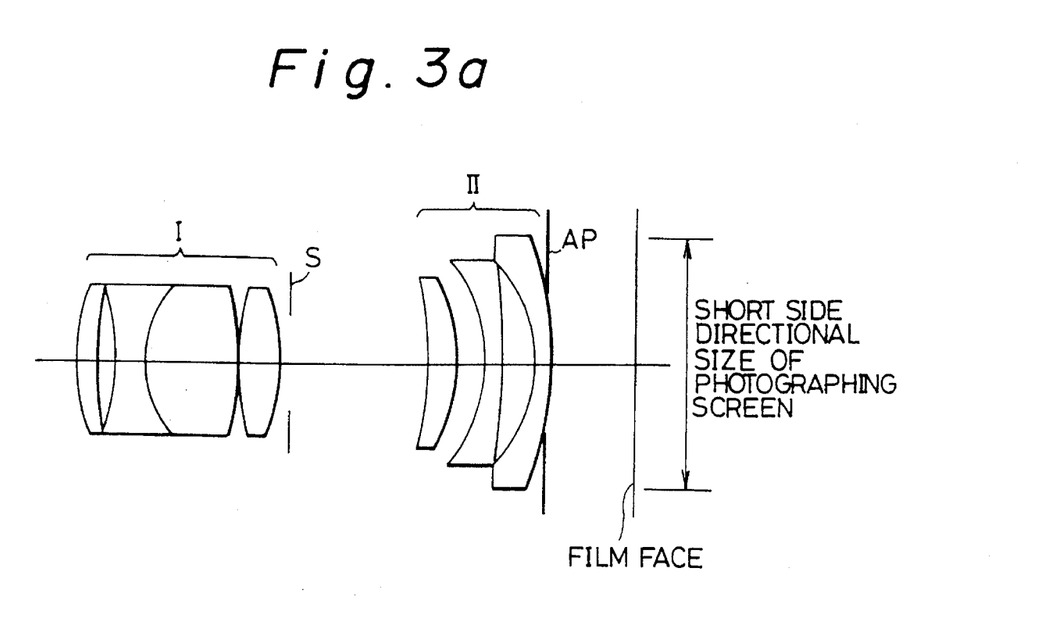

Each of FIGS. 3a and 3b shows an example in which the zoom lens shown in each of FIGS. 1a and 1b is used to take a panoramic photograph. An aperture AP is arranged after a final lens face of the second lens group II. This aperture AP is formed in the shape of a rectangular opening extending in a direction perpendicular to a paper face. As shown in FIG. 3a, the aperture AP is arranged just after the final lens face of the second lens group II at a wide angle end of the zoom lens. At this time, an opening width of this aperture in a short side direction thereof is set such that no light beam focused and formed as an image is interrupted by this aperture in a shorter side direction of a normal photographing screen set to a vertical direction in FIG. 3.

Figure 3B:
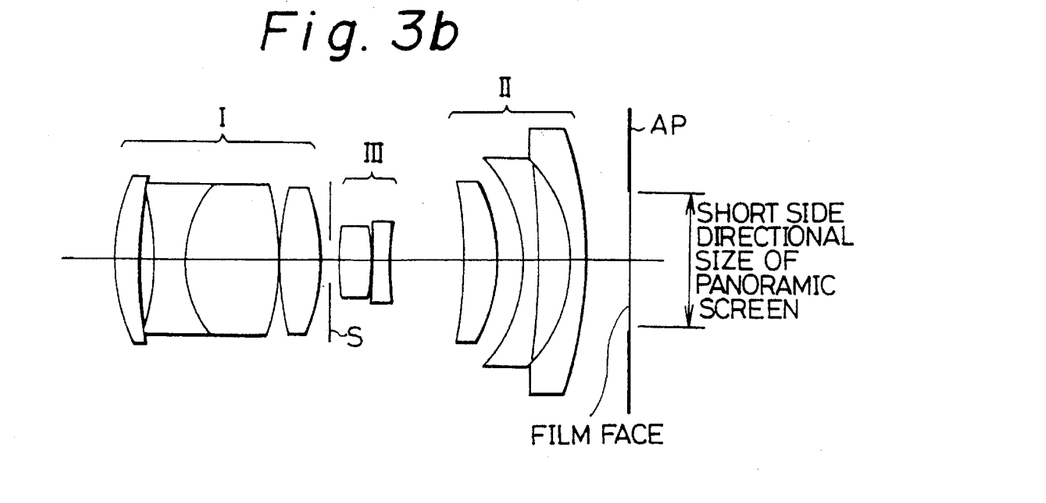

As shown in FIG. 3b, when the panoramic photograph is taken, the converter lens III is mounted to the zoom lens and the entire lens system is set to approach a film face. Further, the aperture AP is moved to a position just before the film face so as to interrupt the light beam formed as an image and arranged outside a panoramic screen.

Numeric values of parameters about the above constructional elements of the zoom lens shown in each of FIGS. 1a and 1b are concretely set as follows.

In FIG. 1a, only the first and second lens groups and the diaphragm are arranged in a state in which no converter lens III is mounted to the zoom lens. In this arrangement, $r_i$ (i=1 to 14) designates a radius of curvature of an i-th lens face including a diaphragm face and counted from the object side of the zoom lens. $d_i$ (1 to 13) designates a distance between the i-th lens face and an (i+1)-th lens face on an optical axis of the zoom lens. $n_j (j=1$ to 7) designates a refractive index of the material of a j-th lens counted from the object side. $v_j (j=1$ to 7) designates an Abbe's number of this j-th lens.

In FIG. 1b, the converter lens III is mounted to the zoom lens. With respect to the converter lens in this arrangement, $R_m$ (m=1 to 4) designates a radius of curvature of an m-th lens face counted from the object side. $D_m$ (m=1 to 4) designates a distance between the m-th lens face and an (m+1)-th lens face on an optical axis of the zoom lens. $N_n$ (n=1 to 2) designates a refractive index of the material of an n-th lens counted from the object side. $v_n$ (n=1 to 2) designates an Abbe's number of this n-th lens. $D_O$ designates a distance from the diaphragm S to a first face of the converter lens on the optical axis. $D_4$ designates a distance from a final face of the converter lens III to a first lens face of the second lens group on the optical axis. In this example, the converter lens III is constructed by one lens having positive refracting power and one lens having negative refracting power. Accordingly, $v_1$ and $v_2$ are respectively set to $v_P$ and $v_N$.

Reference numeral f designates a focal length of the entire lens system. Reference numerals $\omega$ and F/No respectively designate a half field angle and brightness of the zoom lens.

In the following description, a Z-coordinate is set to be in conformity with the optical axis of the zoom lens. A Y-coordinate is set to be perpendicular to the optical axis. Further, r and K respectively designate a radius of curvature of an aspherical surface on the optical axis and a conical constant. A, B, C and D designate aspherical coefficients of higher orders. In this case, as is well known, the aspherical surface is provided by a curved surface obtained by rotating a curve represented by the following formula around the optical axis.

$$Z = (1/r)Y^2 / \{1 + \sqrt{1 - (1+K)(Y/r)^2}\} + A \cdot Y^4 + B \cdot Y^6 + C \cdot Y^8 + D \cdot Y^{10}$$

A shape of the aspherical surface is specified by providing the radius of curvature on the optical axis, the conical constant and the aspherical coefficients of higher orders. With respect to the aspherical coefficients, E and a number subsequent to this E show a power. For example, "E-9" shows $1/10^9$ and this value $1/10^9$ is multiplied by a numeric value before this value.

Numeric values of the above parameters of the zoom lens composed of the two lens groups shown in FIG. 1a are set as follows.

| | f = 39.2–102.0, F/No = 4.6–9.4, $\omega$ = 28.4–12.0° | | | | |
|---|---|---|---|---|---|
| i | $r_i$ | $d_i$ | j | $n_j$ | $v_j$ |
| 1 | 19.281 | 2.38 | 1 | 1.56732 | 42.84 |
| 2 | 59.527 | 1.47 | | | |
| 3 | −22.688 | 2.99 | 2 | 1.83500 | 42.98 |
| 4 | 10.850 | 9.00 | 3 | 1.63854 | 55.45 |
| 5 | −27.173 | 0.10 | | | |
| 6 | 31.164 | 3.83 | 4 | 1.48749 | 70.44 |
| 7 | −21.004 | 1.00 | | | |
| 8 | (diaphragm) | variable | | | |
| 9 | −35.612 | 2.85 | 5 | 1.58144 | 40.89 |
| 10 | −15.663 | 2.70 | | | |
| 11 | −14.677 | 1.50 | 6 | 1.77250 | 49.62 |
| 12 | −88.065 | 3.31 | | | |
| 13 | −13.779 | 1.50 | 7 | 1.48749 | 70.44 |
| 14 | −35.118 | | | | |
| | Variable amounts | | | | |
| f | 39.2 | 63.2 | | 102.0 | |
| $d_8$ | 13.04 | 7.03 | | 3.30 | |

Numeric values of the above parameters of the zoom lens are set as follows in a state in which the converter lens is mounted to the zoom lens as shown in FIG. 1b.

When the converter lens III is mounted to the zoom lens, the above $d_8$ is set to 13.04. Namely, the converter lens III is arranged between the diaphragm S and the second lens group II at a wide angle end of the zoom lens composed of the two ens groups.

| | f = 30, F/No = 8, $\omega$ = 37° | | | | |
|---|---|---|---|---|---|
| m | $R_m$ | $D_m$ | n | $N_n$ | $v_n$ |
| 0 | | 1.000 | | | |
| 1 | 77.291 | 3.000 | 1 | 1.49700 | 81.60 |
| 2 | −31.180 | 0.170 | | | |
| 3 | −92.441 | 1.540 | 2 | 1.69493 | 29.70 |
| 4 | 69.761 | 7.330 | | | |

Each of third and fourth lens faces of the converter lens counted from the object side is constructed by an aspherical surface and numeric values of the above parameters about these third and fourth lens faces are set as follows.

| | Third face | Fourth face |
|---|---|---|
| K | −309.39200 | 78.38800 |
| A | 6.69003E-5 | 1.02329E-4 |
| B | −1.54947E-6 | −7.14835E-6 |
| C | −3.78515E-7 | 3.64454E-8 |
| D | 1.75584E-8 | 4.87204E-9 |

Figure 4A:
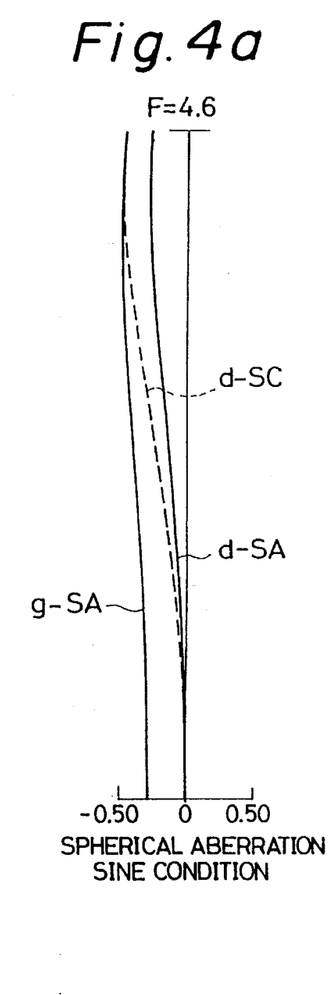
FIG. 4a is an aberrational diagram showing spherical aberration and a sine condition at a wide angle end of a zoom lens composed of two lens groups as a concrete example.
Figure 4B:
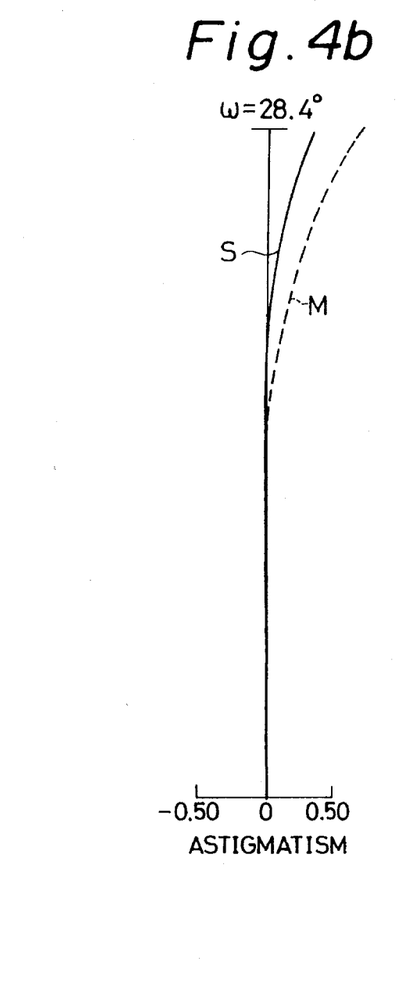
FIG. 4b is an aberrational diagram showing astigmatism at the wide angle end of the zoom lens composed of two lens groups as a concrete example.
Figure 4C:
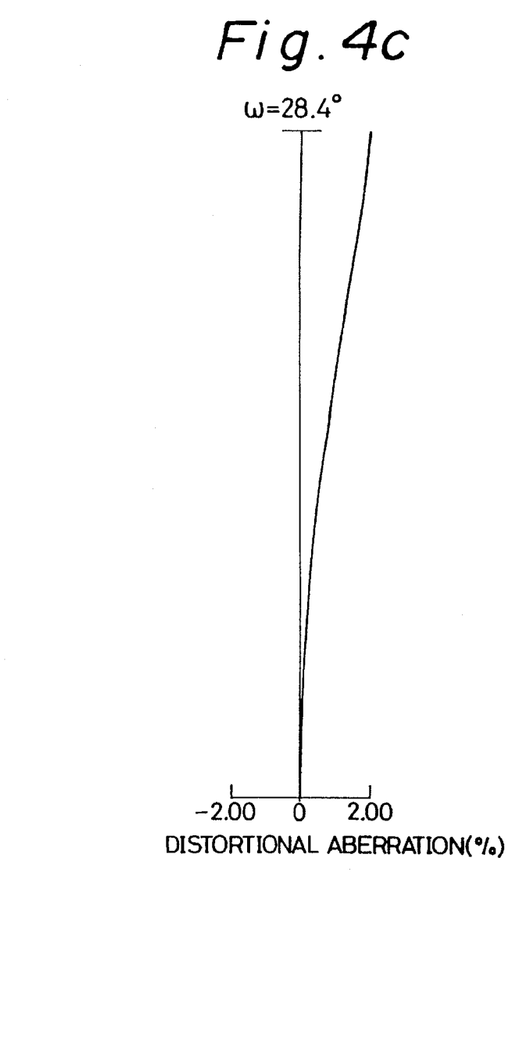
FIG. 4c is an aberrational diagram showing distortional aberration at the wide angle end of the zoom lens composed of two lens groups as a concrete example.
Figure 5A:
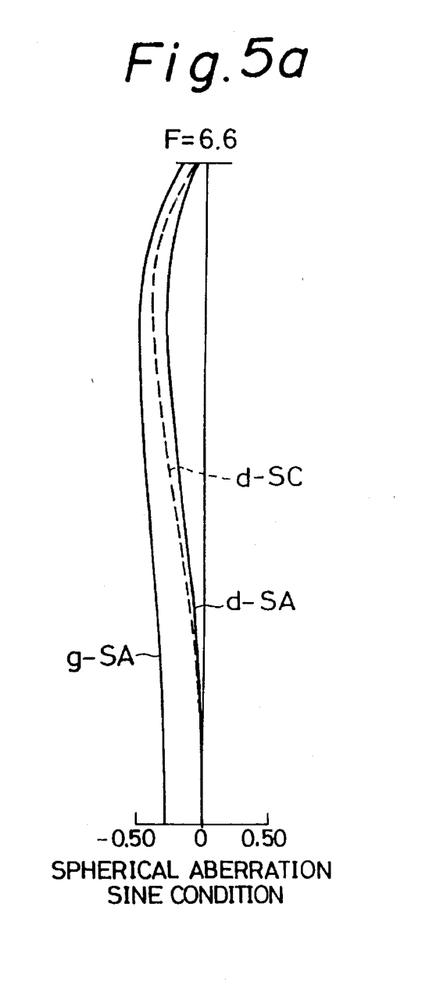
FIG. 5a is an aberrational diagram showing spherical aberration and a sine condition at an intermediate focal length of the zoom lens composed of two lens groups as a concrete example.
Figure 5B:
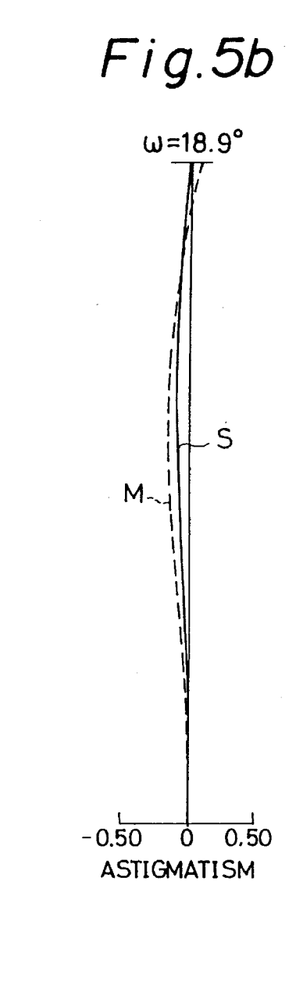
FIG. 5b is an aberrational diagram showing astigmatism at the intermediate focal length of the zoom lens composed of two lens groups as a concrete example.
Figure 5C:
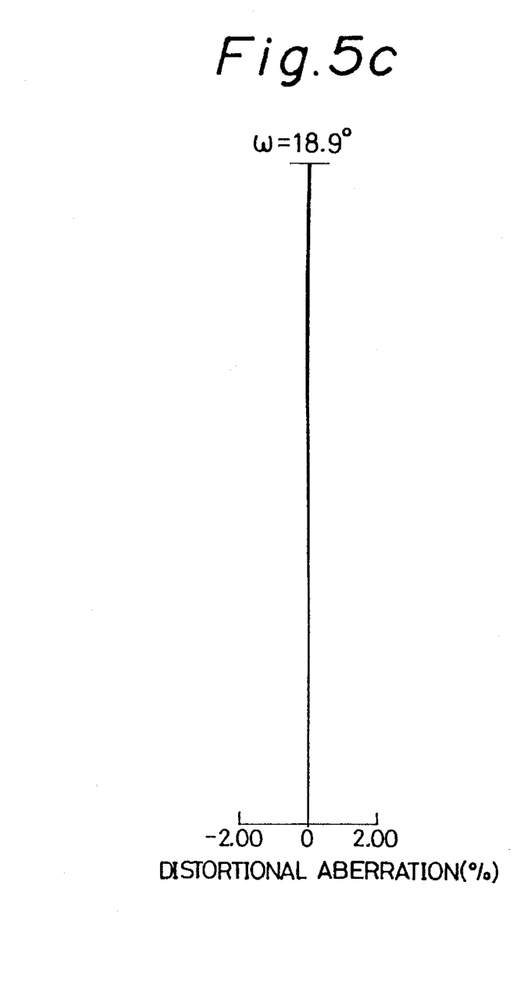
FIG. 5c is an aberrational diagram showing distortional aberration at the intermediate focal length of the zoom lens composed of two lens groups as a concrete example.
Figure 6A:
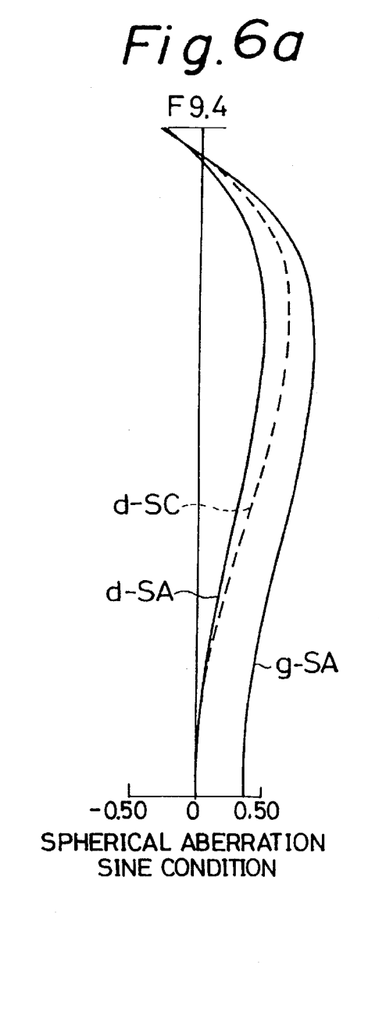
FIG. 6a is an aberrational diagram showing spherical aberration and a sine condition at a telescopic end of the zoom lens composed of two lens groups as a concrete example.
Figure 6B:
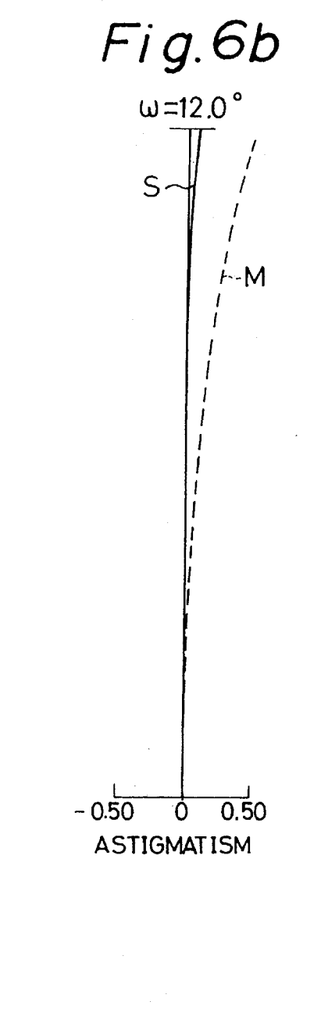
FIG. 6b is an aberrational diagram showing astigmatism at the telescopic end of the zoom lens composed of two lens groups as a concrete example.
Figure 6C:
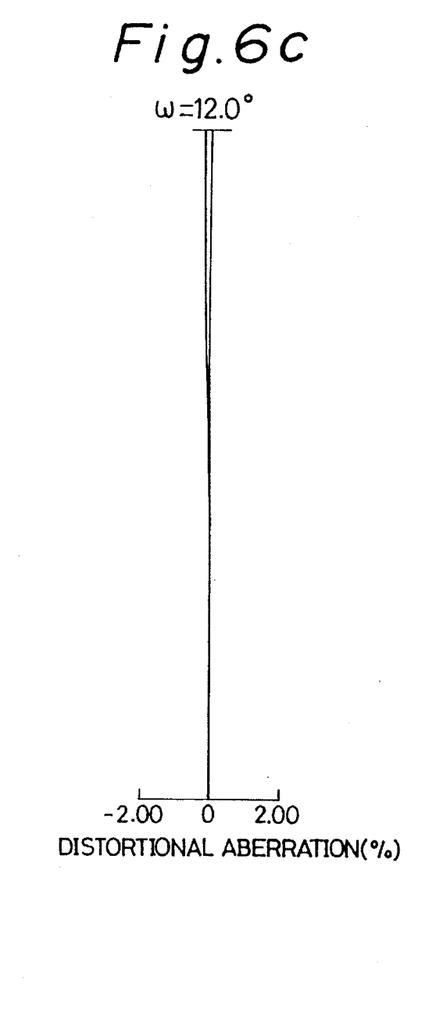
FIG. 6c is an aberrational diagram showing distortional aberration at the telescopic end of the zoom lens composed of two lens groups as a concrete example.
Figure 7A:
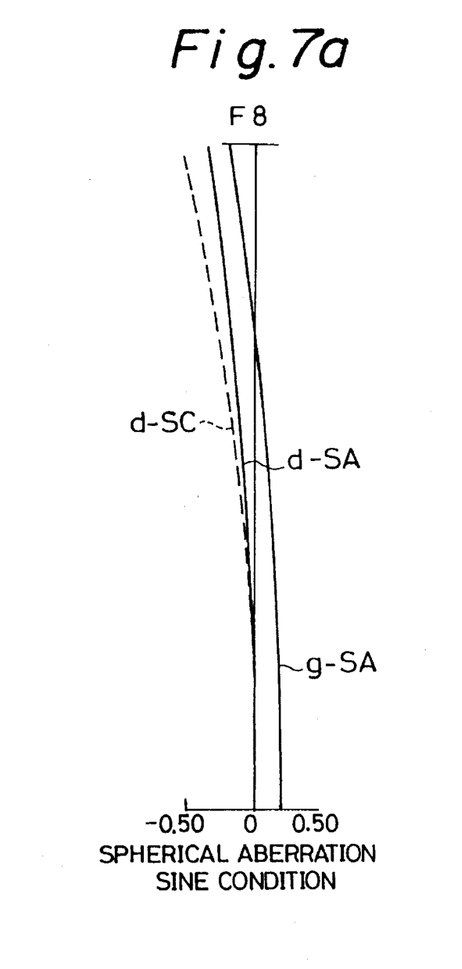
FIGS. 7a to 7c are diagrams of spherical aberration (and a sine condition), astigmatism and distortional aberration provided when a converter lens is mounted to the zoom lens shown in FIG. 1a and a super wide angle state of the zoom lens is realized.
Figure 7B:
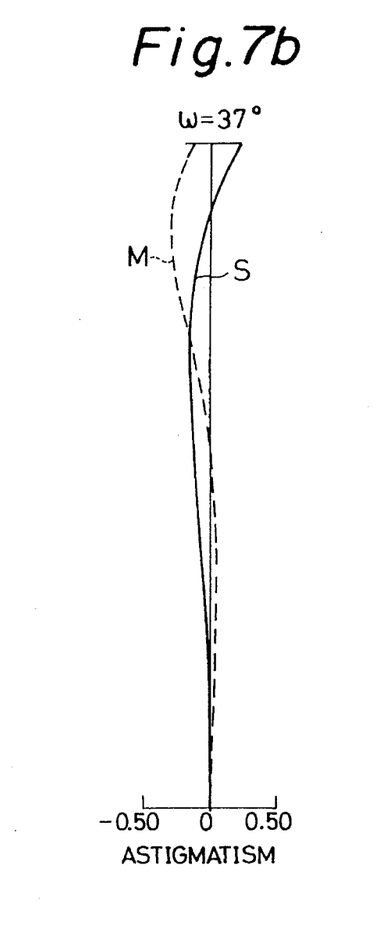
Figure 7C:
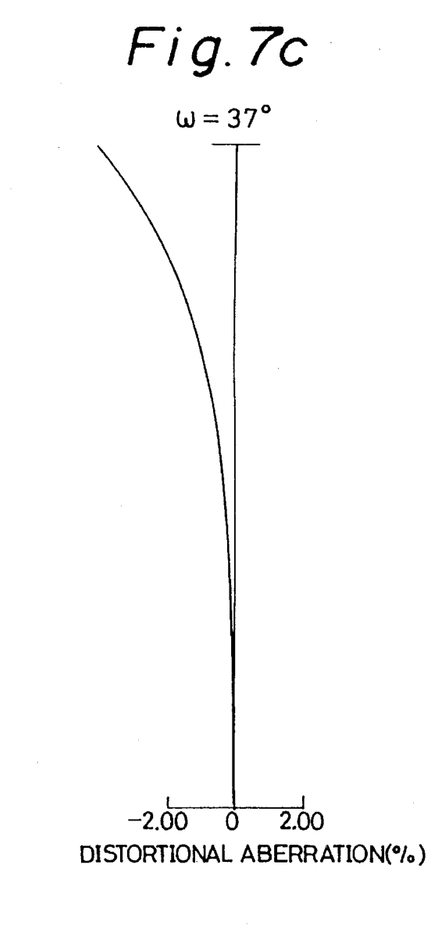
Figure 8A:
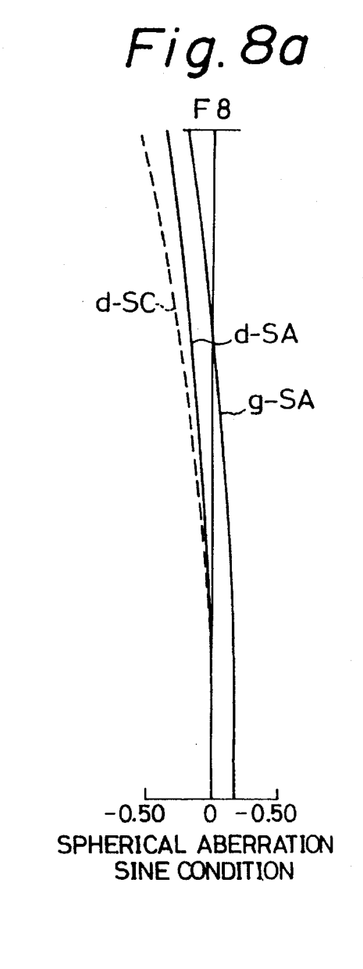
FIGS. 8a to 8c are diagrams of spherical aberration (and a sine condition), astigmatism and distortional aberration provided when a converter lens is mounted to the zoom lens shown in FIG. 1a and a diaphragm is stopped down while a super wide angle state of the zoom lens is realized.
Figure 8B:
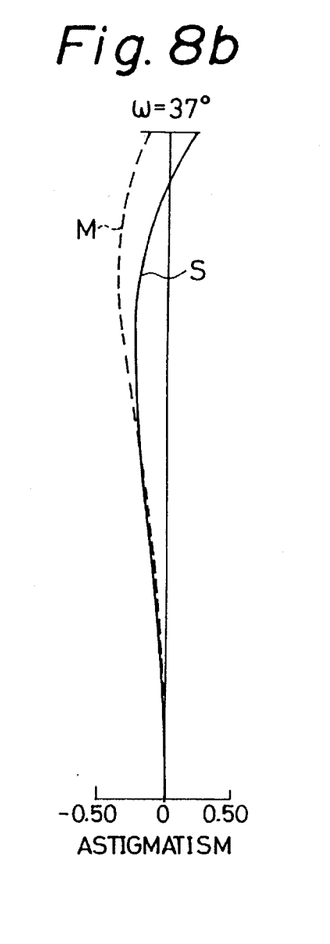
Figure 8C:
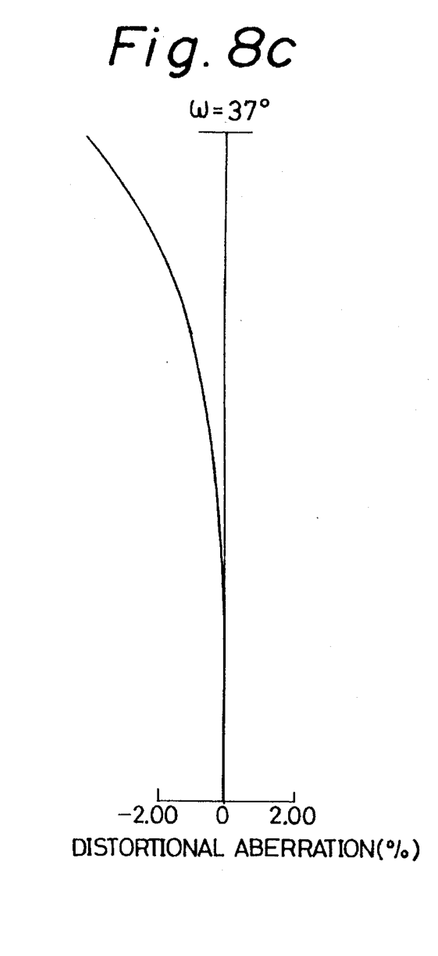

FIGS. 4 to 6 are aberrational diagrams of the above zoom lens composed of the two lens groups. FIGS. 4a to 4c respectively show spherical aberration (and a sine condition), astigmatism and distortional aberration at a wide angle end of the zoom lens. FIGS. 5a to 5c respectively show spherical aberration (and a sine condition), astigmatism and distortional aberration at an intermediate focal length of the zoom lens. FIGS. 6a to 6c respectively show spherical aberration (and a sine condition), astigmatism and distortional aberration at a telescopic end of the zoom lens. Each of FIGS. 7 and 8 is an aberrational diagram in a super wide angle state in which the converter lens III is mounted to the zoom lens. FIGS. 7a to 7c respectively show spherical aberration (and a sine condition), astigmatism and distortional aberration provided when no diaphragm S is stopped down at a mounting time of the converter lens III. FIGS. 8a to 8c respectively show spherical aberration (and a sine condition), astigmatism and distortional aberration provided when the diaphragm S is stopped down in association with mounting of the converter lens III. In FIGS. 8a to 8c, the optical arrangement shown in FIG. 1b is used. In each of these aberrational diagrams, d-SA and g-SA respectively show spherical aberrations on d-line and g-line. d-SC shows a sine condition on the d-line. Reference numerals S and M respectively show a sagittal image surface and a meridional image surface.

The above aberrations are preferably corrected in each of the wide angle, intermediate, telescopic and super wide angle states of the zoom lens in a zooming region so that performance of the zoom lens is preferable.

As mentioned above, in accordance with the above novel zoom lens having a super wide angle in the present invention, the super wide angle can be realized in addition to a zooming region. A converter lens is mounted to the zoom lens in a portion in which the distance between lens groups is increased on a wide angle side. Accordingly, it is possible to minimize an increase in length of an entire lens system caused by mounting the converter lens to the zoom lens.

In each of second to fourth structures of the zoom lens, an aperture of the mounted converter lens can be reduced. In each of the third and fourth structures of the zoom lens, it is possible to restrain a reduction in performance of the zoom lens caused by mounting the converter lens to the zoom lens in addition of the reduction in aperture of the converter lens. In particular, in the fourth structure of the zoom lens, no stopping-down operation of the diaphragm is required in association with the mounting of the converter lens so that a mechanism of the zoom lens is simplified. In a fifth structure of the zoom lens, the converter lens is mounted to the zoom lens at the same lens group distance as a wide angle end. Accordingly, it is not necessary to adjust the lens group distance in attaching and detaching operations of the converter lens so that the structure of the zoom lens is simplified. In a sixth structure of the zoom lens, it is possible to take a panoramic photograph using a super wide angle state. In each of seventh and eighth structures of the zoom lens, it is possible to restrain an increase in each of various kinds of aberrations caused by the mounting of the converter lens.

Many widely different embodiments of the present invention may be constructed without departing from the spirit and scope of the present invention. It should be understood that the present invention is not limited to the specific embodiments described in the specification, except as defined in the appended claims.

What is claimed is:

1. A zoom lens having a super wide angle comprising:

a first lens group having positive refracting power and arranged on an object side of said zoom lens;

a second lens group having negative refracting power and arranged on an image side of said zoom lens; and a converter lens having positive refracting power and detachably attached between said first and second lens groups, a focal length of said zoom lens being changed by changing a distance between said first and second lens groups, said distance being set to be wide on a wide angle side in a zooming region and to be narrow on a telescopic side in said zooming region, said focal length of said zoom lens at the super wide angle being set to be shorter than that at a wide angle end in the zooming region, by mounting said converter lens on the wide angle side without changing said distance between said first and second lens groups on the wide angle side, and a diaphragm of said zoom lens being stopped down in connection with said mounting of said converter lens in a super wide angle state.

2. A zoom lens having a super wide angle according to claim 1, wherein said diaphragm is arranged between said first and second lens groups and said converter lens is mounted between said diaphragm and said second lens group in said super wide angle state.

3. A zoom lens having a super wide angle comprising:

a first lens group having positive refracting power and arranged on an object side of said zoom lens;

a second lens group having negative refracting power and arranged on an image side of said zoom lens; and a converter lens having positive refracting power and detachably attached between said first and second lens groups, a focal length of said zoom lens being changed by changing a distance between said first and second lens groups, said distance being set to be wide on a wide angle side in a zooming region and to be narrow on a telescopic side in said zooming region, said focal length of said zoom lens at the super wide angle being set to be shorter than that at a wide angle end in the zooming region by mounting said converter lens on the wide angle side, and said converter lens having a fixed diaphragm on an object side thereof.

4. A zoom lens having a super wide angle according to claim 1 wherein said distance between said first and second lens groups at a mounting time of said converter lens is equal to that at said wide angle end of said zoom lens in the zooming region.

5. A zoom lens having a super wide angle comprising:

a first lens group having positive refracting power and arranged on an object side of said zoom lens;

a second lens group having negative refracting power and arranged on an image side of said zoom lens; and a converter lens having positive refracting power and detachably attached between said first and second lens groups, a focal length of said zoom lens being changed by changing a distance between said first and second lens groups, said distance being set to be wide on a wide angle side in a zooming region and to be narrow on a telescopic side in said zooming region, said focal length of said zoom lens at the super wide angle being set to be shorter than that at a wide angle end in the zooming region by mounting said converter lens on the wide angle side, and an aperture corresponding to a panoramic size being arranged just after a final lens face of said second lens group and being moved to a position just before an image face in connection wig said mounting of said converter lens.

6. A zoom lens having a super wide angle according to claim 1, wherein said converter lens is constructed by one negative lens and at least one positive lens, and an average Abbe's number $v_P$ of said positive lens is set to be greater than an Abbe's number $v_N$ of said negative lens.

7. A zoom lens having a super wide angle according to claim 6, wherein at least one lens face of said converter lens is constructed by an aspherical surface.

* * * * *